(12) United States Patent
Kryvobok

(10) Patent No.: US 10,101,600 B2
(45) Date of Patent: Oct. 16, 2018

(54) SYSTEMS AND METHODS FOR AMPLIFICATION OF BACK-SCATTERED SIGNAL BY LASER SOURCE CAVITY

(71) Applicant: FLIR Systems, Inc., Wilsonville, OR (US)

(72) Inventor: Artem M. Kryvobok, Ghent (BE)

(73) Assignee: FLIR Systems, Inc., Wilsonville, OR (US)

( * ) Notice: Subject to any disclaimer, the term of this patent is extended or adjusted under 35 U.S.C. 154(b) by 88 days.

(21) Appl. No.: 15/434,734

(22) Filed: Feb. 16, 2017

(65) Prior Publication Data
US 2017/0242280 A1    Aug. 24, 2017

Related U.S. Application Data

(60) Provisional application No. 62/297,942, filed on Feb. 21, 2016.

(51) Int. Cl.
*G02F 1/11*     (2006.01)
*G02B 27/10*    (2006.01)
(Continued)

(52) U.S. Cl.
CPC ........... *G02F 1/113* (2013.01); *G02B 27/106* (2013.01); *H01S 3/0085* (2013.01); *H01S 3/2222* (2013.01)

(58) Field of Classification Search
CPC .. G02B 21/00–21/368; G02B 27/10–27/1093; H01S 3/00–3/0095
See application file for complete search history.

(56) References Cited

U.S. PATENT DOCUMENTS 4,240,746 A * 12/1980 Courtenay ............. G01S 7/484
356/5.05
2006/0182156 A1* 8/2006 Owen ................... H01S 3/1068
372/20

(Continued)

FOREIGN PATENT DOCUMENTS

FR         2973885       10/2012
JP      2010127840        6/2010

OTHER PUBLICATIONS

Amann et al., "Laser ranging: a critical review of usual techniques for distance measurement", Optical Engineering, 2001, pp. 10-19, vol. 40, No. 1.

(Continued)

*Primary Examiner* — Bumsuk Won
*Assistant Examiner* — Jeffrey Madonna
(74) *Attorney, Agent, or Firm* — Haynes and Boone, LLP

(57) ABSTRACT

An example laser system includes a laser source to transmit a source light generated based on optical feedback provided by a laser cavity. The laser system further includes a beam-splitter to split the source light into a reference light and a split source light. The laser system further includes a modulator to modulate the split source light's frequency. The modulated light may be transmitted towards and reflected from a target. The modulator and beam-splitter may receive, frequency-modulate, and pass the reflected light to the laser cavity. The laser cavity amplifies the reflected light and transmits the amplified light toward the beam-splitter, such that the amplified light follows a same path as the reference light. The laser system further includes a detector to receive the reference light and amplified light, and detect a beating frequency as an indication of presence of the reflected light. Related methods and devices are also disclosed.

20 Claims, 3 Drawing Sheets

(51) Int. Cl.
*H01S 3/22* (2006.01)
*H01S 3/00* (2006.01)

(56) References Cited

U.S. PATENT DOCUMENTS

| 2009/0073417 | A1 | 3/2009 | Urata et al. |
| 2011/0080580 | A1* | 4/2011 | Fermann ................ G01N 21/31 356/301 |
| 2014/0376001 | A1 | 12/2014 | Swanson |
| 2015/0185141 | A1* | 7/2015 | Fermann ............ G01N 33/0027 356/451 |

OTHER PUBLICATIONS

Adany et al., "Chirped Lidar Using Simplified Homodyne Detection", Journal of Lightwave Technology, Aug. 15, 2009, pp. 3351-3357, vol. 27, No. 16.

* cited by examiner

SYSTEMS AND METHODS FOR AMPLIFICATION OF BACK-SCATTERED SIGNAL BY LASER SOURCE CAVITY

CROSS-REFERENCE TO RELATED APPLICATIONS

This application claims the benefit of and priority to U.S. Provisional Patent Application No. 62/297,942 filed Feb. 21, 2016 and entitled "SYSTEMS AND METHODS FOR AMPLIFICATION OF BACK-SCATTERED SIGNAL BY LASER SOURCE CAVITY," which is incorporated herein by reference in its entirety.

TECHNICAL FIELD

One or more embodiments of the invention relate generally to laser detection systems and more particularly, for example, to systems and methods for improved amplification of reflected laser light from targets for detection and/or telemetry.

BACKGROUND

Telemetry, reflectometry, and/or detection applications may transmit electromagnetic radiation and measure reflections of the electromagnetic radiation to detect presence of and/or analyze targets that cause the reflections. For example, the electromagnetic radiation may be in the form of laser light. In this example, a laser system including a laser source and associated aligned components, including optical components such as mirrors and lenses, may be utilized to transmit light to and receive light reflected from one or more targets. To detect the targets, determine characteristics of the targets, etc., the reflected light needs to be received with sufficient signal intensity (e.g., at a photo detector). Complex optical paths and higher required sensitivity are generally associated with higher design costs, higher component costs, stricter alignment requirements, among other characteristics.

SUMMARY

In one or more embodiments, a laser system includes a laser source configured to transmit a source laser light. The laser source includes a laser cavity configured to provide optical feedback to generate the source laser light. The laser system further includes a beam-splitter positioned to receive the source laser light transmitted from the laser source to split the source laser light into a reference laser light and a split source laser light. The laser system further includes a modulator positioned to receive the split source laser light and configured to modulate a frequency of the split source laser light in response to a waveform provided by a waveform generator.

In an aspect, the modulator may be an acousto-optic device. At least a portion of the frequency-modulated source laser light is transmitted towards a target and reflected from the target as a reflected laser light. The modulator and the beam-splitter are positioned such that the reflected laser light is received, frequency-modulated, and passed to the laser cavity via the modulator and the beam-splitter. The laser cavity is further configured to amplify the reflected laser light received via the modulator and the beam-splitter and to transmit the amplified reflected laser light towards the beam-splitter, such that at least a portion of the amplified reflected laser light follows a same path as the reference laser light. The laser system further includes a photo detector configured to receive both the reference laser light and the at least a portion of the amplified reflected laser light. The photo detector is further configured to detect a beating frequency as an indication of a presence of the reflected laser light.

In one or more embodiments, a method includes generating a source laser light based on optical feedback provided by a laser cavity. The method further includes transmitting the source laser light toward a beam-splitter. The method further includes splitting the source laser light into a reference laser light and a split source laser light by the beam-splitter. The method further includes frequency-modulating the split source laser light by an acousto-optic modulator. The method further includes transmitting the frequency-modulated source laser light toward a target. The method further includes receiving at least a portion of the frequency-modulated laser light reflected from the target as a reflected laser light.

The method further includes frequency-modulating the reflected laser light by the acousto-optic modulator. The method further includes passing the reflected laser light through the beam-splitter to the laser cavity. The method further includes amplifying the reflected laser light by the laser cavity. The method further includes transmitting the amplified reflected laser light toward the beam-splitter, such that at least a portion of the amplified reflected laser light follows a same path as the reference laser light. The method further includes detecting a beating frequency as an indication of a presence of the reflected laser light, in response to receiving both the reference laser light and the amplified reflected laser.

In one or more embodiments, a detection system includes a laser source configured to transmit a source laser light. The laser source includes a cavity configured to provide optical feedback to generate the source laser light. The detection system further includes a modulator configured to modulate a frequency of a first portion of the source laser light to provide a modulated source laser light. The modulator is further configured to receive a reflected laser light based on a reflection of the modulated source laser light by a target. The modulator is further configured to modulate a frequency of the reflected laser light. The cavity is further configured to receive at least a portion of the modulated reflected laser light. The cavity is further configured to amplify the received portion to generate an amplified modulated reflected laser light.

The cavity is further configured to transmit the amplified modulated reflected laser light. The detection system further includes a detector configured to receive a first laser light and a second laser light. The first laser light is based on a second portion of the source laser light. The second laser light is based on at least a portion of the amplified modulated reflected laser light. The detector is further configured to detect a beating frequency as an indication of a presence of the reflected laser light.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
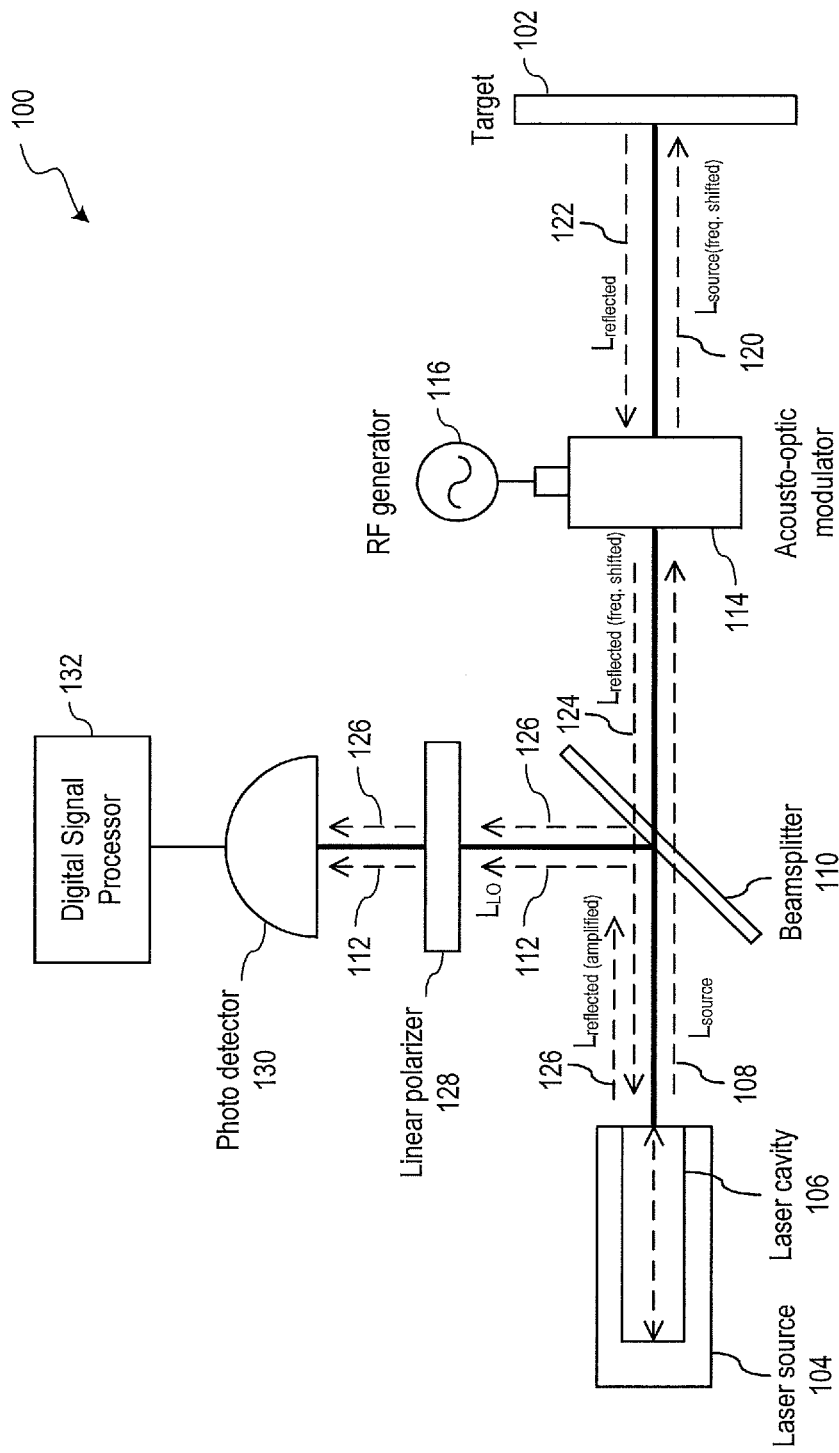
FIG. 1 illustrates a block diagram of a laser system for amplifying and detecting a reflected laser light from a target, in accordance with an embodiment of the disclosure.

Various techniques are disclosed herein to provide laser systems and methods for telemetry, reflectometry, or other detection. In particular, systems and methods disclosed herein may be implemented in or as part of coherent laser detection systems for rangefinding or other telemetry applications to provide simpler optical design, lower cost, and/or higher sensitivity. For example, various embodiments of the disclosure allow laser light that is reflected (e.g., back-scattered) from a target to follow the optical path back to and be amplified by the optical cavity of a laser source (also referred to as laser cavity, resonating cavity, or optical resonator). The optical feedback of the reflected laser light within the laser source cavity generates a side mode which, when mixed with the laser light providing local oscillation (LO), produces a detectable beating signal (e.g., a signal having sufficient signal intensity), thereby advantageously reducing or eliminating the need for a high-sensitivity detection unit which is typically costly and complex. In addition, optical path for the detection of the reflected laser light is also simplified, avoiding the complex and costly optical alignment and arrangement to direct the reflected laser light as typically required in conventional laser detection systems.

Further details of such beneficial features are discussed with reference to FIG. 1, which illustrates an example laser system 100 for amplifying and detecting a reflected laser light from a target 102 in accordance with an embodiment of the disclosure. Laser system 100 includes a laser source 104 having a laser cavity 106. Laser cavity 106 is implemented using an optical cavity, resonating cavity, or optical resonator, and configured to provide optical feedback (e.g., which amplifies the intensity of light) in generating a source laser light 108 (also labeled "$L_{source}$" in FIG. 1) by laser source 104. In various embodiments, laser cavity 106 may be configured to provide polarization (e.g., linear polarization) in addition to the optical feedback, thereby providing source laser light 108 that is polarized (e.g., linearly polarized). In one specific example, laser cavity 106 may include a mixture of helium and neon gas as a gain medium to provide a helium-neon laser ("HeNe laser") light having a center wavelength of 632.8 nm as source laser light 108 that is linearly polarized. In other examples, laser cavity 106 may include other suitable gain medium to provide a source laser light with a certain wavelength and/or other characteristics.

Laser system 100 includes a beam-splitter 110 disposed in the path of source laser light 108 emitted from laser source 104 (e.g., in front of laser source 104) and oriented to split source laser light 108 into one arm that is used as a reference laser light 112 (e.g., a local oscillator (LO), also labeled "$L_{LO}$" in FIG. 1) for coherent detection and another arm that is used for providing a source laser light to be directed to target 102. Beam-splitter 110 according to some embodiments may be implemented as a polarization-independent beam-splitter such that its transmission and reflection of light are not selective with respect to the polarization (e.g., polarization angle) of the incident light.

Source laser light 108 continuing as the signal laser light reaches an acousto-optic modulator ("AOM") 114, such as a Bragg cell, provided in laser system 100 in the path of source laser light 108 following beam-splitter 110. In this regard, laser system 100 includes a radio-frequency ("RF") generator 116 that generates a waveform (e.g., driving signal, RF input signal) in the hundreds of kilohertz range, the hundreds of megahertz range, intervening frequencies, and/or other frequency ranges, which is provided to AOM 114 (e.g., to a piezo-electric transducer of AOM 114 to induce a radio-frequency acoustic wave in AOM 114) to modulate the frequency of source laser light 108. For example, AOM 114 may add a frequency $f_m$ to the frequency $f_{carrier}$ (also referred to herein as a carrier frequency) of source laser light 108 received from laser source 104 via beam-splitter 110. The frequency $f_m$ is based on the waveform provided to AOM 114. In other words, the frequency $f_{carrier}$ of source laser light 108 may be shifted by a frequency $f_m$ to provide a frequency-shifted source laser light 120 (also labeled "$L_{source(freq.\ shifted)}$" in FIG. 1) that is used as a signal laser light to target 102. In this regard, the frequency of the frequency-shifted source laser light 120 may be provided by $f_{carrier}+f_m$. Example values of frequency $f_m$ may include 100 kHz, 50 MHz, 100 MHz, intervening frequencies, or other frequencies.

Frequency-shifted source laser light 120, or signal laser light 120, is directed to target 102 (e.g., by one or more optical elements such as a lens in some embodiments, not shown in FIG. 1), impinges on target 102, and is reflected (e.g., back-scattered) by target 102. It is contemplated for other embodiments that AOM 114 may be configured to modulate the amplitude and/or the phase of source laser light 108, in addition to or as an alternative to modulating the frequency.

A reflected laser light 122 (also labeled "$L_{reflected}$" in FIG. 1), which represents as least some of the source laser light 120 reflected or scattered from target 102 that travels back to laser system 100, follows the same path back to AOM 114. In an aspect, reflected laser light 122 has the same frequency as frequency-shifted source laser light 120. Reflected laser light 122 typically has only a fraction of the intensity of source laser light 120, but can be used for telemetry or other detection by virtue of being amplified according to embodiments of the disclosure. Because reflected laser light 122 is the light back from target 102 that follows the same path back to AOM 114, it is also frequency-modulated by AOM 114 to become a frequency-shifted reflected laser light 124 (also labeled "$L_{reflected(freq.\ shifted)}$" in FIG. 1) that passes through beam-splitter 110 and reaches laser cavity 106 by virtue of the optical alignment of AOM 114 and beam-splitter 110 and the orientation of beam-splitter 110. For instance, AOM 114 may add a frequency $f_m$ to reflected laser light 122, such that with reference to the prior example the frequency of frequency-shifted reflected laser light 124 may be provided by $f_{carrier}+2f_m$.

Frequency-shifted reflected laser light 124 thus enters laser cavity 106, and is amplified by optical feedback provided by laser cavity 106. In this regard, according to some embodiments, laser cavity 106 may be configured to provide a laser linewidth that covers the frequency shift provided by AOM 114, and/or RF generator 116 may be configured to provide a radio frequency (e.g., a range of radio frequency) that allows the linewidth of the frequency-shifted reflected laser light 124 (shifted twice by AOM 114) to fall within the bandwidth provided by laser cavity 106. Because frequency-shifted reflected laser light 124 has a linewidth within the laser linewidth associated with laser cavity 106, frequency-shifted reflected laser light 124 is also amplified and linearly polarized by laser cavity 106 and leaves laser cavity 106 as amplified reflected laser light 126 (also labeled "$L_{reflected(amplified)}$" in FIG. 1). That is, amplified reflected laser light 126 is generated as a side mode of laser cavity 106. In an aspect, amplified reflected laser light 126 has a frequency provided by $f_{carrier}+2f_m$.

Amplified reflected laser light 126 follows the same path through beam-splitter 110 as reference laser light 112 due to the optical arrangement and orientation of laser source 104 and beam-splitter 110. A linear polarizer 128 is provided in this path of amplified reflected laser light 126 and reference laser light 112, and configured to pass light having a polarization (e.g., polarization angle) associated with amplified reflected laser light 126 and reference laser light 112. Because amplified reflected laser light 126 and reference laser light 112 are linearly polarized by laser cavity 106, providing linear polarizer 128 matched to the polarization angle associated with amplified reflected laser light 126 and reference laser light 112 allows amplified reflected laser light 126 and reference laser light 112 to pass through while blocking noise that may be spread across various polarization angles. Thus, providing linear polarizer 128 in this way may beneficially provide noise rejection and improved detection of target 102. Although the foregoing is described with respect to linearly polarized light, in some cases, laser cavity 106 may be configured to generate laser light with other types of polarizations, such as elliptical polarization or circular polarization. In these cases, a polarizer may be configured to receive and pass through laser light that has the polarization provided by laser cavity 106.

A photo detector 130 is provided in the path of amplified reflected laser light 126 and reference laser light 112 after they pass through linear polarizer 128. Photo detector 130, according to various embodiments, may be implemented using a PIN-photodiode, Avalanche photodiode, or other suitable types of photomultiplier or photon counter. Amplified reflected laser light 126 and reference laser light 112 are mixed at photo detector 130, and the beating frequency is produced at photo detector 130 due to the frequency difference of the two. As amplified reflected laser light 126 has made two passes through AOM 114, the frequency of amplified reflected laser light 126 is different from reference laser light 112 (local oscillator) by approximately $f_{2M}$, thereby producing a detectable beating frequency of approximately $f_{2M}$ at photo detector 130. In this regard, $f_{2M}$ may be provided by $2f_m$, where $f_m$ is the frequency modulation applied by in one pass through AOM 114.

Figure 2:
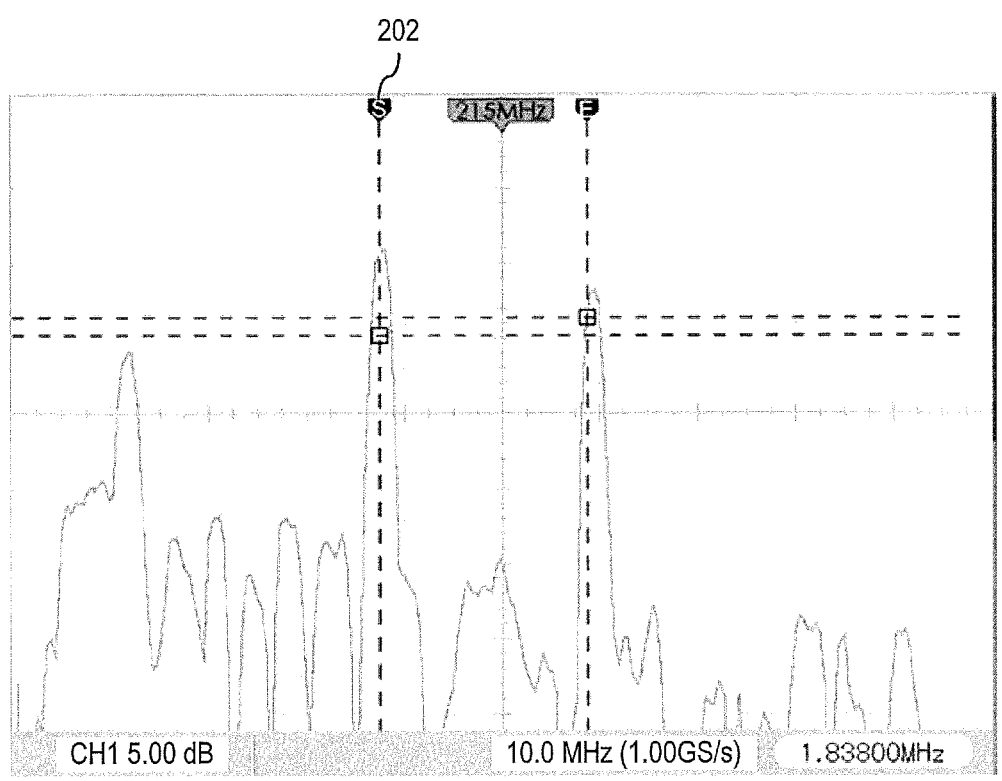
FIG. 2 illustrates a graph showing an example beating frequency that is detected by the laser system of FIG. 1, in accordance with an embodiment of the disclosure.

FIG. 2 illustrates an example of a beat frequency detected at photo detector 130, in accordance with an embodiment of the disclosure. In the example of FIG. 2, RF generator 116 generates an RF waveform of approximately 100 MHz, which has been added to the amplified reflected laser light 126 twice (once on outbound to source laser light 108 and once on inbound to reflected laser light 122) by AOM 114. Thus, a corresponding beat frequency 202 is clearly detectable at approximately 200 MHz, without any additional amplification or signal conditioning. In another example, RF generator 116 may generate an RF waveform of around 100 kHz, which has been added to the amplified reflected laser light 126 twice by AOM 114. In this example, a corresponding beat frequency is detectable at approximately 200 kHz without any additional amplification or signal conditioning.

More generally, RF generator 116 may generate RF waveforms of other frequencies to cause appropriate frequency shifting of light incident on AOM 114.

Returning to FIG. 1, photo detector 130 may be communicatively coupled to digital signal processor ("DSP") 132 (e.g., including a processor or other logic device or circuitry) that is configured to further process the detected beating frequency for telemetry, reflectometry, or other detection applications. Note that conventional laser systems and methods for detection application typically include an amplifier or other circuitry for amplifying and/or conditioning the signal from a photo detector and/or the photo detector may be implemented in a complex arrangement (e.g., a balanced detector arrangement) for sensitive detection, because the reflected laser light from a target often does not have the intensity or the quality to allow detection by a simple photo detector (such as photo detector 130). In contrast, embodiments of the disclosure advantageously allow the reflected laser light to travel in the same path back to the laser cavity and be amplified by the laser cavity and also provide noise rejection through polarization provided by the laser cavity and filtering by a polarizer (e.g., linear polarizer), such that a detection can be performed without additional amplification or conditioning components. Furthermore, by allowing the reflected laser light to travel back through the same path as the source laser light, the number of optical paths may be reduced and the optical alignment may be simplified in comparison with conventional laser detection systems that require a separate optical path for detection of the reflected laser light.

The principles of laser system 100 discussed above thus also illustrate a method for a laser detection system that allows low cost, simple amplification and detection of reflected laser light for various laser telemetry and detection applications. It is also contemplated that laser system 100 discussed above may be implemented in or as part of a laser system (e.g., including a LIDAR system) for various telemetry and detection applications. For example, the principles and spirit of laser system 100 may be applied to provide a frequency-modulated continuous wave ("FMCW") rangefinder laser system (e.g., by modulating the frequency of the source laser light using a AOM or electro-optic modulator and configuring the DSP to process the detected beat frequency) or a pulse-based rangefinder laser system that is simpler and more cost-effective thereby advantageously reducing or eliminating the need for a high-sensitivity detection unit which are typically costly and complex. In addition, optical path for the detection of the reflected laser light is also simplified, avoiding the complex and costly optical alignment and arrangement to direct the reflected laser light as typically required in conventional laser detection systems.

Figure 3:
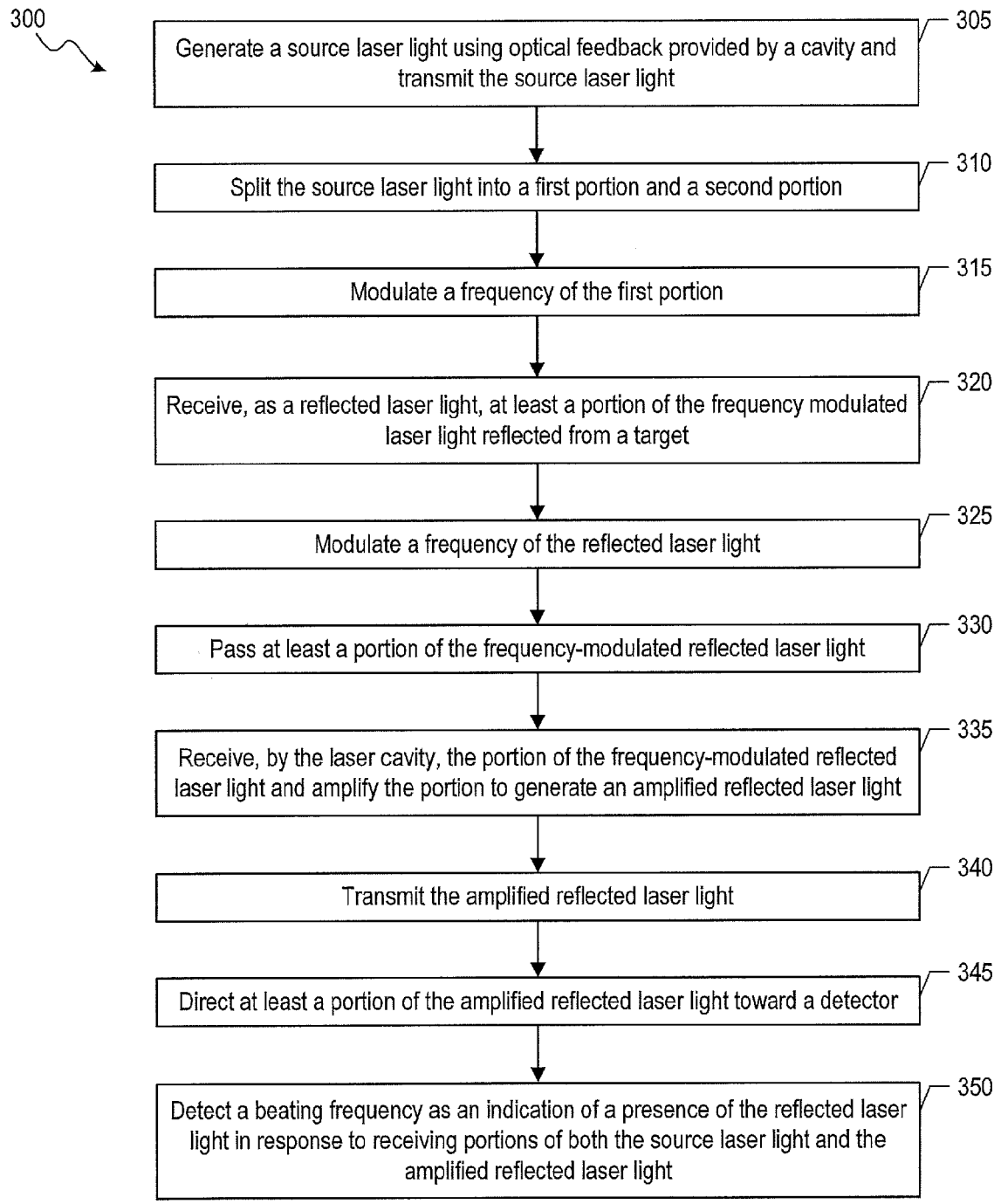
FIG. 3 illustrates a flow diagram of an example process for amplifying and detecting a reflected laser light from a target, in accordance with an embodiment of the present disclosure.

FIG. 3 illustrates a flow diagram of an example process for amplifying and detecting a reflected (e.g., back-scattered) laser light from a target, in accordance with an embodiment of the present disclosure. For explanatory purposes, the example process 300 is primarily described herein with reference to laser system 100 and components thereof shown in FIG. 1; however, the example process 300 is not limited to laser system 100 and components thereof shown in FIG. 1. The blocks of example process 300 are described herein as occurring in serial, or linearly (e.g., one after another). However, multiple blocks of example process 300 may occur in parallel. In addition, the blocks of example process 300 need not be performed in the order shown and/or one or more of the blocks of example process 300 need not be performed.

At block 305, a laser source (e.g., 104) transmits a source laser light (e.g., 108). The laser source may include a laser cavity (e.g., 106) that provides optical feedback to amplify signals with frequencies encompassed by a linewidth of the laser cavity. The laser cavity may generate the source laser light of a frequency $f_{carrier}$. In some cases, the laser cavity may output polarized light (e.g., linearly polarized light), such that the source laser light is polarized. For example, the laser source may be an HeNe laser source.

At block 310, a beam-splitter (e.g., 110) receives the source laser light and splits the source laser light into a first portion and a second portion. The first portion of the source laser light may be referred to as a reference laser light or local oscillator signal (e.g., 112). The second portion of the source laser light may be referred to as a split source laser light. The first and second portions of the source laser light have a frequency of $f_{carrier}$. In an aspect, the beam-splitter splits the source laser light such that the reference laser light is directed to a detector (e.g., 130) and the split source laser light is directed to a modulator (e.g., AOM 114). Although FIG. 1 illustrates an example implementation in which the split source laser light is along the same direction as the source laser light 108 and the reference laser light 112 is perpendicular to the source laser light 108, in other implementations the orientations of the source laser light 108, reference laser light 112, and split source laser light may be different from that shown in FIG. 1. The beam-splitter may be implemented as a polarization-independent beam-splitter, such that its transmission and reflection of light are not selective with respect to a polarization of light incident on the beam-splitter.

At block 315, a modulator (e.g., AOM 114) receives the split source laser light and modulates a frequency of the split source laser light. In some cases, the modulator may add a frequency $f_m$ to the frequency $f_{carrier}$ of the split source laser light. For example, the frequency $f_m$ may be 100 MHz. In the case of an AOM, a waveform (e.g., an RF waveform) is applied to the AOM to generate sound waves, and the sound waves cause the frequency shift of the split source laser light. The frequency $f_m$ is based at least in part on the waveform.

At block 320, the modulator receives at least a portion of the frequency-modulated laser light reflected from a target (e.g., 102) as a reflected laser light (e.g., 122). The portion may include the portion of the frequency-modulated laser light that is back-scattered by the target. At block 325, the modulator modulates a frequency of the reflected laser light. In an aspect, the modulator may add a frequency $f_m$ to the reflected laser light, such that the frequency-modulated reflected laser light (e.g., 124) has a frequency provided by $f_{carrier}+2f_m$. At block 330, the beam-splitter passes at least a portion of the frequency-modulated reflected laser light.

At block 335, the laser cavity receives at least a portion of the frequency-modulated reflected laser light and amplifies it. In this regard, the laser cavity may allow at least a portion of the frequency-modulated reflected laser light from the beam-splitter to couple into the laser cavity. The portion that is coupled into the laser cavity may be amplified using optical feedback provided by the laser cavity. In an aspect, the laser cavity has components (e.g., mirrors) configured such that the linewidth of the laser cavity encompasses the frequencies $f_{carrier}$ and $f_{carrier}+2f_m$. In another aspect, the laser cavity may have tunable components (e.g., positions of the mirror may be adjustable) to allow the laser cavity to lase at $f_{carrier}$ and/or at $f_{carrier}+2f_m$ as needed.

At block 340, the laser source transmits the amplified reflected laser light (e.g., 126). For instance, the laser source may transmit the amplified reflected laser light in the same direction that the laser source transmitted the source laser light at block 305.

At block 345, the beam-splitter directs at least a portion of the amplified reflected laser light toward a detector (e.g., 130). In this regard, the beam-splitter may split the amplified reflected laser light such that the portion of the amplified reflected laser light follows a same path as the reference laser light.

At block 350, a detector (e.g., 130) detects a beating frequency as an indication of a presence of the reflected laser light, in response to receiving both the reference laser light and the amplified reflected laser light. In some cases, the detector may be communicatively coupled to a DSP (e.g., 132) that can process the detected signal and/or associated beating frequency for telemetry, reflectometry, and/or other detection applications.

In some cases, the laser cavity may output polarized light (e.g., linearly polarized light), such that the source laser light and the amplified reflected laser light are polarized. In such cases, in an aspect, the reference laser light and the amplified reflected laser light may pass through a polarizer (e.g., 128) en route to the detector. The polarizer may allow polarization associated with the amplified reflected laser light and reference laser light to pass through while blocking noise that may be spread across various polarization angles. The polarizer may beneficially provide noise rejection and improved detection of the target.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A laser system, comprising:
   a laser source configured to transmit a source laser light, the laser source including a laser cavity configured to provide optical feedback to generate the source laser light;
   a beam-splitter positioned to receive the source laser light transmitted from the laser source to split the source laser light into a reference laser light and a split source laser light;
   a modulator positioned to receive the split source laser light and configured to modulate a frequency of the split source laser light in response to a waveform provided by a waveform generator,
   wherein at least a portion of the frequency-modulated source laser light is transmitted towards a target and reflected from the target as a reflected laser light;

wherein the modulator and the beam-splitter are positioned such that the reflected laser light is received, frequency-modulated, and passed to the laser cavity via the modulator and the beam-splitter;

wherein the laser cavity is configured to amplify the reflected laser light received via the modulator and the beam-splitter and to transmit the amplified reflected laser light towards the beam-splitter, such that at least a portion of the amplified reflected laser light follows a same path as the reference laser light; and wherein the laser system further comprises a photo detector configured to receive both the reference laser light and the at least a portion of the amplified reflected laser light, the photo detector being configured to detect a beating frequency as an indication of a presence of the reflected laser light.

2. The laser system of claim 1, wherein the laser cavity is configured to provide linear polarization, the laser system further comprising a linear polarizer positioned between the beam-splitter and the photo detector, the linear polarizer being configured to pass the reference laser light and the amplified reflected laser light that are linearly polarized by the laser cavity while substantially blocking light having other polarization angles.

3. The laser system of claim 1, wherein the modulator comprises an acousto-optic modulator configured to receive a waveform provided by a waveform generator, and wherein a frequency of the frequency-modulated source laser light is based at least in part on the waveform.

4. The laser system of claim 1, wherein a linewidth of the laser source encompasses a frequency of the source laser light and a frequency of the reflected laser light received via the modulator and the beam-splitter.

5. The laser system of claim 1, wherein the source laser light has a frequency of $f_{carrier}$, the frequency-modulated source laser light has a frequency of $f_{carrier}+f_m$, and the reflected laser light received via the modulator and the beam-splitter has a frequency of $f_{carrier}+2f_m$.

6. The laser system of claim 1, wherein the reflected laser light comprises a portion of the frequency-modulated source laser light back-scattered from the target.

7. A method comprising:
generating a source laser light based on optical feedback provided by a laser cavity;
transmitting the source laser light toward a beam-splitter;
splitting the source laser light into a reference laser light and a split source laser light by the beam-splitter;
frequency-modulating the split source laser light;
transmitting the frequency-modulated source laser light toward a target;
receiving at least a portion of the frequency-modulated laser light reflected from the target as a reflected laser light;
frequency-modulating the reflected laser light;
passing the reflected laser light through the beam-splitter to the laser cavity;
amplifying the reflected laser light by the laser cavity;
transmitting the amplified reflected laser light toward the beam-splitter, such that at least a portion of the amplified reflected laser light follows a same path as the reference laser light; and
detecting a beating frequency as an indication of a presence of the reflected laser light, in response to receiving both the reference laser light and the amplified reflected laser.

8. The method of claim 7, wherein the laser cavity is configured to provide linear polarization, the method further comprising passing the reference laser light and the amplified reflected laser light that are linearly polarized by the laser cavity while substantially blocking light having other polarization angles.

9. The method of claim 7, wherein a frequency of the frequency-modulated source laser light is based at least in part on a waveform applied to a modulator.

10. The method of claim 7, wherein the reflected laser light comprises a portion of the frequency-modulated source laser light that is back-scattered from the target.

11. The method of claim 7, wherein the source laser light follows a first path to the beam-splitter, and wherein the reflected laser light passed through the beam-splitter follows the first path to the laser cavity.

12. A detection system, comprising:
a laser source comprising a cavity, wherein the cavity is configured to:
provide optical feedback to generate a source laser light; and
provide the source laser light;
a modulator configured to:
modulate a frequency of a first portion of the source laser light to provide a modulated source laser light;
receive a reflected laser light based on a reflection of the modulated source laser light by a target; and
modulate a frequency of the reflected laser light;
wherein the cavity is further configured to:
receive at least a portion of the modulated reflected laser light;
amplify the received portion to generate an amplified modulated reflected laser light; and
provide the amplified modulated reflected laser light; and
wherein the detection system further comprises:
a detector configured to:
receive a first laser light and a second laser light, wherein the first laser light is based on a second portion of the source laser light, and wherein the second laser light is based on at least a portion of the amplified modulated reflected laser light; and
detect a beating frequency as an indication of a presence of the reflected laser light.

13. The detection system of claim 12, further comprising a beam-splitter configured to:
split the source laser light into the first portion and the second portion; and
direct at least a portion of the modulated reflected laser light toward the cavity.

14. The detection system of claim 13, wherein the beam-splitter is configured to:
receive the source laser light that has traversed over a first path; and
direct the portion of the modulated reflected laser light to the first path to the cavity.

15. The detection system of claim 12, wherein the cavity is further configured to provide polarization, the detection system further comprising a polarizer configured to pass the second portion of the source laser light and the amplified modulated laser light while substantially blocking light associated with other polarizations.

16. The detection system of claim 12, wherein the modulator comprises an acousto-optic modulator configured to receive a waveform and modulate the frequency of the first portion of the source laser light and the reflected laser light based at least on the waveform.

17. The detection system of claim 12, wherein the source laser light has a frequency of $f_{carrier}$ the modulated source laser light has a frequency of $f_{carrier}+f_m$, and the amplified modulated reflected laser light has a frequency of $f_{carrier}+2f_m$.

18. The detection system of claim 12, wherein a linewidth of the cavity encompasses a frequency of the source laser light and a frequency of the modulated reflected laser light.

19. The detection system of claim 12, wherein the reflected laser light comprises a portion of the modulated source laser light back-scattered by the target.

20. The detection system of claim 12, wherein the second portion of the source laser light and at least a portion of the amplified modulated reflected laser light follow a same path from the laser source to the detector.

* * * * *